United States Patent [19]

Nakase et al.

[11] 3,917,563

[45] Nov. 4, 1975

[54] PROCESS FOR THE PRODUCTION OF HIGH MOLECULAR WEIGHT POLYOXYMETHYLENE BY THE POLYMERIZATION OF TETRAOXANE

[75] Inventors: Yoshiaki Nakase; Masaru Yoshida, both of Takasaki; Tadashi Iwai, Kanagawa; Akihiko Ito, Takasaki, all of Japan

[73] Assignee: Japan Atomic Energy Research Institute, Tokyo, Japan

[22] Filed: Oct. 23, 1973

[21] Appl. No.: 408,490

Related U.S. Application Data

[63] Continuation-in-part of Ser. No. 114,704, Feb. 11, 1971, abandoned.

[30] Foreign Application Priority Data

Feb. 17, 1970  Japan................................ 45-13077

[52] U.S. Cl. ........................ 260/67 FP; 204/159.21
[51] Int. Cl.² .......................................... C08G 2/10
[58] Field of Search ............. 260/67 FP; 204/159.21

[56] References Cited

UNITED STATES PATENTS

| | | |
|---|---|---|
| 3,457,226 | 7/1969 | Miyake et al. .................. 260/67 FP |
| 3,616,368 | 10/1971 | Ishigaki et al.................. 204/159.21 |
| 3,705,876 | 12/1972 | Amann et al..................... 260/67 FP |
| 3,830,715 | 8/1974 | Ito et al. ......................... 204/159.21 |

*Primary Examiner*—Lucille M. Phynes
*Attorney, Agent, or Firm*—Stevens, Davis, Miller & Mosher

[57] ABSTRACT

Pure and high molecular weight polyoxymethylene can be efficiently and economically produced in good yield by the polymerization of tetraoxane using a radical-forming material such as a peroxide, some nitrogen-containing compounds, a gaseous mixture containing ozone, an aqueous or organic solvent solution of hydrogen peroxide, and the like without requiring the coexistence of any known initiators for cationic polymerization.

15 Claims, No Drawings

PROCESS FOR THE PRODUCTION OF HIGH MOLECULAR WEIGHT POLYOXYMETHYLENE BY THE POLYMERIZATION OF TETRAOXANE

This invention is continuation-in-part of Ser. No. 114,704, filed February 11, 1971 now abandoned.

This invention relates to a process for the production of pure and high molecular weight polyoxymethylene by the polymerization of tetraoxane. More particularly, the invention relates to a process for the production of pure and high molecular weight polyoxymethylene from tetraoxane as a starting material, characterized in that the polymerization of tetraoxane is carried out in the presence of a certain radical-forming material in an amount within a certain range which may function as a polymerization catalyst without requiring coexistence of any known cationic initiators at a temperature within a certain range, the process being carried out very advantageously from an industrial viewpoint.

High molecular weight polyoxymethylene has superior tensile strength and is very strong. It has also superior fatigue resistance. And more, it is often said that its hygroscopic and weather-proofing properties are superior to those of nylon. It also has superior resistance to various chemicals and is a good electrical insulator. Thus, it can be used for various parts of machines, automobiles and the like as well as for making synthetic fibers.

Though polyoxymethylene is a very important industrial material, it is not always easy to obtain the polymer efficiently on an industrial scale.

At present, high molecular weight polyoxymethylene is produced on a commercial base by the process of E. I. du Pont de Nemours & Co. Inc., U.S.A. from formaldehyde monomer, which process comprises dissolving formaldehyde monomer in a hydrocarbon solvent such as toluene and polymerizing the formaldehyde in a liquid phase at a low temperature using an amine as a polymerization catalyst. This process, however, has several disadvantages. One is that formaldehyde is difficult to handle, because it is gaseous at ordinary temperatures, and because it is hard to control the polymerization reaction. Another is that since this polymerization is based on an ionic polymerization mechanism, water must be eliminated from the polymerization system because water is a polymerization inhibitor in the ionic polymerization system. Accordingly, the formaldehyde to be used as a starting material must be carefully purified and, especially, water contained therein must be eliminated before it is used in the polymerization system; such purification is troublesome and costly. So, it has long been recognized that, if a process were found by which pure and high molecular weight polyoxymethylene could be produced on an industrial scale, using a solid starting material such as trioxane and tetraoxane, it would be a great advance in the art. With this goal in mind, many studies have been carried out to find a process for producing high molecular weight polyoxymethylene using trioxane as a starting material but very few studies on tetraoxane, and the results of many such experiments have been reported, including the following:

1. Journal of Polymer Science A2 2929, 1964 reports that polyoxymethylene was obtained in a yield of only about 1% by polymerizing trioxane in solid phase using benzoyl peroxide as a polymerization catalyst;

2. Another paper reports that an oxymethylene polymer can be obtained by polymerizing trioxane in the presence of maleic anhydride, using benzoyl peroxide as a polymerization catalyst (J.P.S. A-1, 4, 1731, 1966). It should be noted, however, that in this case the coexistence of a large amount of maleic anhydride in the polymerization is indispensable.

3. In addition to the reports mentioned above, Japanese Pat. No. 20309/68 discloses that trioxane can be copolymerized with itaconic anhydride in the presence of a peroxide compound. Among the papers mentioned above, the second and the third papers teach that the coexistence of maleic or itaconic anhydride is indispensable for the advantageous polymerization of trioxane into an oxymethylene polymer, in addition to the presence of benzyl peroxide or any other peroxide. It is evident that these processes cannot provide high molecular weight polyoxymethylene of a substantial purity, because the polymers obtained according to these processes always contain maleic or itaconic anhydride copolymerized therewith or attached thereto as the result of some chemical or physical forces. And more, none of these processes have given a yield of polymer sufficient to make the production thereof commercially feasible.

By the process of British Celanese Ltd., polyoxymethylene polymer is produced on a commercial scale using trioxane as a starting material. In this process, however, trioxane is copolymerized with ethyleneoxide or 1,3-dioxolane in the presence of a cationic catalyst for polymerization. Accordingly, it is natural that this process can not give high molecular weight polyoxymethylene of substantial purity. And more, since this process is also based on the ionic polymerization mechanism, no water can be present in the polymerization system, because water is a polymerization-inhibitor in the ionic polymerization system. Thus, the process also requires troublesome steps for purifying the starting material.

U.S. Pat. No. 3,705,876, Amann et al., discloses that trioxane is polymerized in the presence of a radical generator. But, it should be noted that this U.S. patent process always requires the existence of a cationic catalyst for polymerization such as protonic acids, ansolvo acids and cation-forming compounds in addition to the presence of a radical generator. And more, in this case, the radical generator is not used as an initiator for polymerization, but is used as an agent to reduce the temperature peak and the loss of monomers by evaporation generally encountered in the polymerization of trioxane by means of the cationic polymerization. A short reference to tetraoxane is found in this paper, but no actual data are shown about the polymerization of tetraoxane. Thus, said U.S. patent does not provide any information about the polymerization of tetraoxane. Moreover, only a few studies on tetraoxane polymerization have been reported.

At any rate, there have been no processes for the production of pure and high molecular weight polyoxymethylene on a commercially feasible scale using a solid starting material such as tetraoxane.

Accordingly, one object of the present invention is to provide a process for the production of pure and high molecular weight polyoxymethylene using a solid starting material, tetraoxane, in a yield sufficient to make feasible the production thereof on an industrial scale.

Another object of the process invention is to provide a process for the production of pure and high molecular weight polyoxymethylene in good yield by polymerizing tetraoxane in solid or liquid phase using, as polymerization catalysts, inexpensive materials such as a gaseous mixture of ozone and a gas which is inert to ozone such as oxygen, nitrogen and the like, air irradiated with an ionizing radiation, a liquid mixture of hydrogen peroxide and water or organic solvent such as ethyl ether, and the like, or peroxides such as benzoyl peroxide, and many other materials the thermal decomposition of which can provide a free radical.

It is a further object of the present invention to provide a process for the production of pure and high molecular weight polyoxymethylene by polymerizing tetraoxane in solid or liquid phase without requiring the elimination of water from the starting material or the polymerization system.

It is a further object of the present invention to provide a process for producing pure and high molecular weight polyoxymethylene the efficiency of which is substantially improved by application of an ionizing radiation as part of said process.

These and other objects of the present invention can be attained according to the present invention by polymerizing tetraoxane in solid or liquid phase in the presence of from about 0.0001% to about 10% by weight of tetraoxane of a radical-forming material which may function as a polymerization catalyst without requiring the coexistence of any known cationic initiators at a temperature within the range of from about 60°C to about 140°C.

This invention has been accomplished based on the unexpected discovery of the present inventors that tetraoxane can be advantageously polymerized into high molecular weight polyoxymethylene in the presence of a specific amount of free radicals produced from specific radical-forming materials within a specific range of temperature.

Useful radical-forming materials which can be advantageously employed in the practice of the present invention include inorganic peroxides such as ozone, hydrogen peroxide and the like as well as organic peroxides such as benzoyl peroxide, lauroyl peroxide, acetyl peroxide, di-tert-butyl peroxide, cumene hydroperoxide, t-butyl hydroperoxide, dimethyl peroxate, di-tert-butyl peroxate, diphenyl peroxate and the like; azobisnitriles such as 2,2'-azobisisobutylonitrile, 2,2'-azobispropionitrile and the like; azo and diazo-compounds such as azothioether, azobenzene and the like; organic nitrates such as methyl nitrate, ethyl nitrate and the like; organic nitrites such as butyl nitrite, isoamyl nitrite and the like; organic hyponitrites such as di-tert-butyl hyponitrite, organic hypohalogenites such as tert-butyl hypochlorite and the like; oxygen or air irradiated with an ionizing radiation or an ultraviolet light. Ozone can be used as part of a gaseous mixture comprising ozone and a gas which is inert to ozone such as oxygen, nitrogen and the like; hydrogen peroxide can be used as part of a liquid mixture comprising hydrogen peroxide and water or an organic solvent such as ethyl ether. Among those, benzoyl peroxide, 2,2'-azobisisobutylonitrile, di-tert-butyl peroxide, azobenzene, a gaseous mixture containing ozone, air irradiated with an ionizing radiation and a liquid mixture containing hydrogen peroxide are preferred as the radical-forming materials.

The amount of a radical-forming material to be incorporated in tetraoxane monomer as a starting material in the practice of the present invention is within the range of from about 0.0001% to about 10% by weight, preferably from about 0.001% to about 5% by weight of tetraoxane.

When a gaseous mixture containing ozone is employed as a radical-forming material in the practice of the present invention, the mixture consisting essentially of from about 85 to about 99.999% by weight of oxygen gas or the other gas which is inert to ozone and from about 0.001 to about 15% by weight of ozone can be advantageously employed. In this case also, the amount of ozone is preferably within the range of from about 0.0001% to about 10% by weight of tetraoxane to be polymerized.

If irradiated air is employed in the practice of the present invention, the air preferably contains ozone in the proportion of from about 0.001% to about 15% by weight of the air. In this case also, the amount of ozone is preferably within the range of from about 0.0001% to about 10% by weight of tetraoxane to be polymerized. Air irradiated with an ionizing radiation at a dose rate of $10^2$–$10^8$ rad/hr for the total dose of $10^3$–$10^8$ rad can be used conveniently.

When an aqueous solution of hydrogen peroxide is employed as a polymerization catalyst in the practice of the present invention, the aqueous solution containing from about 3% to about 35% by weight of the solution of hydrogen peroxide can be conveniently employed. And if a liquid mixture containing hydrogen peroxide and an organic solvent is employed as a polymerization catalyst, the mixture preferably consists essentially of from about 0.1 to about 10% by weight of hydrogen peroxide and from about 90 to about 99.9% by weight of an organic solvent such as ethyl ether.

In the practice of the present invention, the polymerization can be carried out either in solid phase or in liquid phase; that is, bulk or solution polymerization ca be effected conveniently. Polymerization in solid phase, however, generally gives preferred results.

When solid radical-forming material is to be used, especially when it is to be used in a very small amount, it is preferred to make a solution thereof by dissolving the solid in an inert solvent such as cyclohexane, n-hexane, benzene, dioxane and the like before the solution is incorporated in tetraoxane. Making a solution of the catalyst by using solvents such as those as mentioned above is effective for obtaining uniform dispersion of the catalyst in the polymerization system.

In the practice of the present invention, the polymerization can be conveniently carried out at a temperature within the range of from about 60°C to about 140°C. The polymerization in solid phase, however, must be carried out below 114°C, since tetraoxane melts at 114°C.

The polymerization of the present invention can be effected in any atmosphere, but preferably, it is carried out in the presence of at least a small amount of oxygen. It can be carried out in an atmosphere of a gaseous mixture such as a mixture of ozone and oxygen, a mixture of ozone and nitrogen, a mixture of ozone and another gas inert to ozone such as carbon dioxide and the like as well as in air at an atmospheric, reduced or elevated pressure.

After polymerization, the polymer thus obtained is washed well with a solvent, such as acetone, which can dissolve unreacted tetraoxane monomer and a catalyst. The polymer obtained according to the process of the present invention is always white and crystalline. The intrinsic viscosity [$\eta$] of the product polymer is determined in a p-chlorophenol solution containing 2% by weight of $\alpha$-pinene at 60°C.

In the practice of the present invention, if desired, polymerization can be accelerated by irradiating the polymerization system with an ionizing radiation or an ultraviolet light before or during the polymerization. Ionizing radiations such as $\alpha$-rays, $\beta$-rays, $\gamma$-rays, X-rays, an accelerated electron beam, a beam of heavy particles or mixtures thereof can be employed, $\gamma$-rays and an accelerated electron beam being preferred. The ionizing radiation or the ultraviolet light is generally applied to the polymerization system at a dose rate of from about $10^2$ to about $10^8$ rad/hr for a total dose of from about $10^3$ to about $10^8$ rad.

The invention is further illustrated by the following examples of preferred embodiments thereof, although it will be understood that these examples are included merely for purposes of illustration and are not intended to limit the scope of the invention unless otherwise specifically indicated.

EXAMPLE 1

1 Gram of tetraoxane purified by sublimation was put in a glass ampoule, and then 10 $\mu$l of an n-hexane solution containing 3% by weight of benzoyl peroxide was incorporated therein. The amount of benzoyl peroxide was 0.02% by weight of tetraoxane.

Then, the polymerizations were carried out in a heating bath of 110°C for 4 and 24 hours respectively. Then, the polymerized products thus obtained were washed well with acetone to remove the unreacted tetraoxane monomer as well as the catalyst incorporated therein. Then, the polymers obtained were dried at a reduced pressure and at room temperature. The polymers thus obtained were white and crystalline, polymerization yields being 10% and 19%, [$\eta$] of the polymers being 0.4 and 0.5 respectively.

When the polymerization were carried out under the same conditions as mentioned above but in the absence of benzoyl peroxide, no polymerized products were obtained.

EXAMPLE 2

Example 1 was repeated except that the polymerization systems were irradiated with $^{60}$Co-$\gamma$ ray for a dose of $1 \times 10^5$ rad at −78°C before the polymerizations were started. For the polymerizations of 4 hours and 24 hours respectively, polymerization yields of 34% and 40% were obtained and [$\eta$] were 1.7 in both cases. The above results show that the molecular weights of polymers thus obtained are significantly higher than those obtained without irradiation as in Example 1.

EXAMPLE 3

1 Gram of tetraoxane purified by sublimation was put in a glass ampoule, and then 10 $\mu$l of a 1,4-dioxane solution of 2,2'-azobisisobutyronitrile containing 2% by weight of 2,2'-azobisisobutyronitrile was incorporated therein. Thus, the amount of 2,2'-azobisisobutyronitrile was 0.02% by weight of tetraoxane. Then, the polymerization was carried out in a heating bath of 110°C for 48 hours. After that, the polymerized product was treated in the same way as mentioned in Example 1. [$\eta$] of the polymer obtained was 0.3 and the yield of a polymer was 24%.

When the polymerization was carried out using di-tert-butyl peroxide instead of 2,2'-azobisisobutyronitrile, the polymer of [$\eta$] = 0.4 was obtained in a yield of 18%.

EXAMPLE 4

The polymerizations were carried out according to the conditions of Example 1 except that instead of incorporating an n-hexane solution of benzoyl peroxide in tetraoxane, 10 ml of a gaseous mixture consisting substantially of 0.2% by weight of tetraoxane of ozone and oxygen as a remaining part was put into an evacuated glass ampoule containing tetraoxane as a starting material, and the ampoule was sealed. The the polymerizations were carried out for 24 and 48 hours. In both cases, polymers of [$\eta$] = 0.3 were obtained in yields of 28% and 98% respectively.

When the polymerization was carried out in a similar way using 10 ml of air irradiated with $\gamma$-ray at a room temperature for the dose of $1 \times 10^5$ rad, instead of using said gaseous mixture of ozone and oxygen, at 105°C and at a pressure of 400 Torr for 8 hours, a polymer of [$\eta$] = 1.0 was obtained in a yield of 25%.

EXAMPLE 5

1 Gram of tetraoxane purified by sublimation was put in a glass ampoule, and 10 $\mu$l of an aqueous solution containing 30% by weight of hydrogen peroxide was added thereto. Then, the polymerizations were carried out for 6 hours in a heating bath of 60°C, 105°C and 140°C respectively. Polymers of [$\eta$] = 1.3, 1.0 and 0.3 were obtained in yields of 5%, 93% and 14% respectively.

EXAMPLE 6

The polymerizations were carried out as mentioned in Example 5 but using a heating bath of 110°C and the amounts of the aqueous solution of hydrogen peroxide added being 1, 5, 10 and 30 $\mu$l respectively.

Polymers of [$\eta$] = 0.4, 0.7, 1.1 and 0.4 were obtained in yields of 21%, 36%, 94% and 83% respectively.

When the polymerizations were carried out according to the same process as mentioned above except that trioxane was used as a starting material instead of tetraoxane, and the polymerizations were effected in a heating bath at 55°C, no polymers were obtained irrespective of the amounts of hydrogen peroxide added to trioxane. Incidentally, the melting point of trioxane is 62°C.

EXAMPLE 7

1 Gram of tetraoxane purified by sublimation was put in a glass ampoule to be polymerized in liquid phase. The polymerization system in liquid phase was prepared by adding 0.5 ml of n-hexane to tetraoxane and 10 $\mu$l of 30% by weight aqueous hydrogen peroxide solution thereto. Then, the polymerization was carried out at 105°C for 6 hours. A polymer of [$\eta$] = 0.4 was obtained in a yield of 97%.

When the polymerization was carried out for 6 hours in molten phase by making the polymerization system of molten state by heating to 140°C without using any solvent and then adding an aqueous solution of hydrogen peroxide thereto, a polymer of $[\eta] = 0.3$ was obtained in a yield of 15%.

The polymerization of trioxane in liquid phase was tried at 105°C without using any solvent, but no polymer was obtained even after continuing the process for 24 hours.

EXAMPLE 8

1 Gram of tetraoxane purified by sublimation was put in a glass ampoule and 10 μl of an ethyl ether solution containing 0.1% by weight of tetraoxane of hydrogen peroxide was added thereto. Then, the polymerization was carried out in a heating bath at 110°C for 6 hours. A polymer of $[\eta] = 0.9$ was obtained in a yield of 12%.

EXAMPLE 9

1 Gram of tetraoxane purified by sublimation was put in a glass ampoule, and 10 μl of a cyclohexane solution containing 3% by weight of tetraoxane of azobenzene was added thereto. Then, the ampoule was sealed and polymerization was carried out in a heating bath at 105°C for 2 hours. The succeeding procedures were as mentioned in Example 1.

A white and crystalline polymer of $[\eta] = 1.1$ was obtained in a yield of 25%.

It was a surprising discovery of the present inventors, that in spite of the fact that trioxane would not be polymerized into pure and high molecular weight polyoxymethylene, or might be polymerized only with a yield of at most 1% by carrying out the polymerization in the presence of a radical-forming material such as benzoyl peroxide, tetraoxane can be advantageously polymerized in the presence of said radical-forming material. Based on the discovery as mentioned above, the present inventors have accomplished the present invention, which, we believe, will give a great deal of profit to the art and industry. It is especially profitable from the viewpoint of industry that according to the process of the present invention, it has become possible to produce pure and high molecular weight polyoxymethylene from a solid starting material, tetraoxane, by using an inexpensive material, as a polymerization catalyst, such as a gaseous mixture of ozone and an inert gas, an aqueous solution of hydrogen peroxide, air irradiated with an ionizing radiation and the like.

Although the invention has been described in considerable detail with reference to certain preferred embodiments thereof, it will be understood that variations and modifications can be effected without departing from the spirit and scope of the invention as described hereinabove and as defined in the appended claims.

What is claimed is:

1. A process for producing a high molecular weight polyoxymethylene polymer by polymerizing tetraoxane in the solid phase at a temperature range of from about 60°C. to below 114°C. in the presence of from about 0.0001% to about 10% based on tetraoxane weight of a radical forming material as a catalyst.

2. The process in accordance with claim 1 in which said radical forming material is selected from the group consisting of a peroxide, an azo compound, a diazo compound, an organic nitrate, an organic nitrite, an organic hyponitrite, an organic hypohalogenite, oxygen irradiated with an ionizing radiation, and air irradiated with an ionizing radiation.

3. The process in accordance with claim 1 in which the polymerization is carried out in liquid phase.

4. The process in accordance with claim 1 in which a radical-forming material dissolved in an inert solvent is added to tetraoxane.

5. The process in accordance with claim 1 in which said radical-forming material is benzoyl peroxide.

6. The process in accordance with claim 1 in which said radical forming material is 2,2'-azobisisobutylonitrile.

7. The process in accordance with claim 1 in which said radical forming material is azobenzene.

8. The process in accordance with claim 1 in which said radical-forming material is di-tert-butyl peroxide.

9. A process for the production of high molecular weight polyoxymethylene by polymerizing tetraoxane in an atmosphere of a gaseous mixture consisting essentially of from about 85 to about 99.999% by weight of oxygen gas or other gas inert to ozone and from about 0.001 to about 15% by weight of ozone at a temperature within the range of from about 60°C to about 140°C, the amount of ozone being within the range of from about 0.0001% to about 10% by weight of tetraoxane.

10. The process in accordance with claim 1 in which the polymerization is carried out in the presence of an aqueous solution of hydrogen peroxide containing from about 3% to about 35% by weight of hydrogen peroxide, the amount of hydrogen peroxide being within the range of from about 0.0001% to about 10% by weight of tetraoxane.

11. The process in accordance with claim 1 in which the polymerization is carried out in the presence of a liquid mixture consisting essentially of from about 0.1% to about 10% by weight of hydrogen peroxide and from about 90% to about 99.9% by weight of an organic solvent for hydrogen peroxide, the amount of hydrogen peroxide being within the range of from about 0.0001% to about 10% by weight of tetraoxane.

12. A process for the production of high molecular weight polyoxymethylene by polymerizing tetraoxane in an atmosphere of air irradiated with an ionizing radiation at a dose rate of from about $10^2$ to about $10^8$ rad/hr for a total dose of from about $10^3$ to about $10^8$ rad, said polymerization being carried out at a temperature within the range of from about 60°C to about 140°C.

13. The process in accordance with claim 1 in which the polymerization is carried out under simultaneous irradiation with an ionizing radiation or the ultraviolet light at a dose rate within the range of from about $10^2$ to about $10^8$ rad/hr for a total dose of from about $10^3$ to about $10^8$ rad.

14. The process in accordance with claim 13 in which the ionizing radiation is $^{60}$Co-γ ray.

15. The process in accordance with claim 13 in which the ionizing radiation is a high energy electron beam.

* * * * *